US011498518B2

(12) United States Patent
Scheele et al.

(10) Patent No.: US 11,498,518 B2
(45) Date of Patent: Nov. 15, 2022

(54) RADAR-BASED OCCUPANCY DETECTOR FOR AUTOMOBILES

(71) Applicant: LITTELFUSE, INC., Chicago, IL (US)

(72) Inventors: Juergen Scheele, Bremen (DE); Efrem Fesshaie, Norwich (GB); Rimantas Misevičius, Kaunas (LT)

(73) Assignee: Littelfuse, Inc., Chicago, IL (US)

( * ) Notice: Subject to any disclaimer, the term of this patent is extended or adjusted under 35 U.S.C. 154(b) by 443 days.

(21) Appl. No.: 16/686,171

(22) Filed: Nov. 17, 2019

(65) Prior Publication Data

US 2020/0172049 A1 Jun. 4, 2020

Related U.S. Application Data

(60) Provisional application No. 62/772,698, filed on Nov. 29, 2018.

(51) Int. Cl.
*B60R 22/48* (2006.01)
*B60R 16/03* (2006.01)
*G01S 13/04* (2006.01)

(52) U.S. Cl.
CPC ............ *B60R 22/48* (2013.01); *B60R 16/03* (2013.01); *G01S 13/04* (2013.01)

(58) Field of Classification Search
None
See application file for complete search history.

(56) References Cited

U.S. PATENT DOCUMENTS

| | | | | |
|---|---|---|---|---|
| 6,529,809 B1* | 3/2003 | Breed | ............. | B60R 21/01554 180/268 |
| 2002/0095980 A1* | 7/2002 | Breed | ............. | B60N 2/2863 73/146 |
| 2003/0217882 A1* | 11/2003 | Sakakida | ............. | B60R 22/41 180/268 |
| 2004/0107550 A1* | 6/2004 | Lee | ............. | B60R 21/01546 24/303 |
| 2004/0111845 A1* | 6/2004 | Lee | ............. | B60R 22/48 24/303 |
| 2005/0209755 A1* | 9/2005 | Sugiura | ............. | B60R 22/18 701/45 |
| 2009/0093932 A1 | 4/2009 | McCall et al. | | |

(Continued)

FOREIGN PATENT DOCUMENTS

CA 2454012 C * 8/2007 ............. G01S 15/04
DE 102018108376 A1 * 10/2018 ............. B60N 2/01

(Continued)

OTHER PUBLICATIONS

Extended European Search Report dated Mar. 24, 2020 for European Patent Application No. 19210967.6.

*Primary Examiner* — Fekadeselassie Girma
(74) *Attorney, Agent, or Firm* — KDB Firm PLLC

(57) ABSTRACT

A radar-based occupancy detection system that includes a seatbelt buckle disposed adjacent a seat of a vehicle and a radar module disposed within the seatbelt buckle, the radar module including an antenna, a radio frequency (RF) transmitter, a RF receiver, and a processor, the antenna configured to broadcast a RF signal generated by the RF transmitter toward the seat, the processor configured to derive signal information from output received from the receiver and to characterize occupancy of the seat based on the signal information.

16 Claims, 2 Drawing Sheets

(56) References Cited

U.S. PATENT DOCUMENTS

| | | | |
|---|---|---|---|
| 2010/0283593 A1 | 11/2010 | Miller et al. | |
| 2012/0089299 A1* | 4/2012 | Breed | G01S 15/88 |
| | | | 701/1 |
| 2014/0132056 A1* | 5/2014 | Yilma | B60R 22/20 |
| | | | 297/481 |
| 2014/0253314 A1* | 9/2014 | Rambadt | B60N 2/002 |
| | | | 340/457.1 |
| 2017/0158023 A1* | 6/2017 | Stevanovic | B60H 1/00971 |
| 2018/0300676 A1* | 10/2018 | Peterson | G05D 1/0278 |
| 2018/0334011 A1* | 11/2018 | Kumar | B60H 1/00564 |
| 2019/0084513 A1* | 3/2019 | Yamamoto | B60R 22/46 |
| 2019/0339207 A1* | 11/2019 | Finn | B25J 19/027 |
| 2020/0108811 A1* | 4/2020 | Wijffels | B60T 7/18 |

FOREIGN PATENT DOCUMENTS

| | | | | |
|---|---|---|---|---|
| WO | WO-2009040711 A2 * | 4/2009 | | A61B 5/02438 |
| WO | WO-2009049400 A1 * | 4/2009 | | G01S 13/58 |
| WO | WO-2015174963 A1 * | 11/2015 | | A61B 5/024 |

* cited by examiner

RADAR-BASED OCCUPANCY DETECTOR FOR AUTOMOBILES

CROSS-REFERENCES TO RELATED APPLICATIONS

This application claims the benefit of U.S. Provisional Patent Application No. 62/772,698, filed Nov. 29, 2018, the entirety of which is incorporated by reference herein.

FIELD OF THE DISCLOSURE

The disclosure relates generally to the field of automobile sensors and relates more particularly to a radar-based automobile occupancy detector.

BACKGROUND OF THE DISCLOSURE

Occupancy detection systems are commonly employed in automobiles for determining whether seats in an automobile contain occupants. This information is used to facilitate or improve the operation of numerous systems within automobiles. For example, an occupancy detection system may output a signal to a seatbelt buckle system of an automobile indicting that a particular seat in the automobile contains an occupant, and the seatbelt buckle system may in-turn activate notification indicia (e.g., a "seatbelt unbuckled" status light and/or a chime) if a seatbelt associated with the occupied seat is unbuckled. In another example, the deployment of airbags associated with a particular seat in an automobile may be dictated according to whether or not an occupant is detected within the seat, and the force and/or size of airbag deployment may be varied according to the type of occupant (e.g., child or adult) that is detected in the seat. In another example, a climate control system of an automobile may direct cooled or heated air to particular spaces or zones within an automobile depending on whether or not occupants are detected in seats associated with such zones.

Traditionally, occupancy detection within automobiles has been achieved by implementing pressure sensors within the seats of automobiles. However, such sensors are associated with numerous shortcomings, including an inability to determine whether a seat is occupied by a human or an inanimate object, and an inability to determine whether an occupant of a seat is an adult or a child/infant. Additionally, implementing pressure sensors in the seats of automobiles is costly and complex. It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a radar-based occupancy detection system in accordance with the present disclosure may include a seatbelt buckle disposed adjacent a seat of a vehicle, and a radar module disposed within the seatbelt buckle, the radar module including an antenna configured to broadcast a radio frequency (RF) signal toward the seat.

Another exemplary embodiment of a radar-based occupancy detection system in accordance with the present disclosure may include a seatbelt buckle disposed adjacent a seat of a vehicle, and a radar module disposed within the seatbelt buckle, the radar module including an antenna configured to broadcast a RF signal toward the seat, a RF transmitter and a RF receiver coupled to the antenna, and a processor coupled to the receiver, wherein the processor is configured to derive signal information from output received from the receiver, the signal information including at least one of time of flight, frequency change, and amplitude ratio, wherein the processor is configured to characterize occupancy of the seat based on the signal information, and wherein the processor is configured to communicate information relating to occupancy of the seat to a system in the vehicle to influence operation of such system.

BRIEF DESCRIPTION OF THE DRAWINGS

By way of example, various embodiments of the disclosed system will now be described, with reference to the accompanying drawings, wherein.

DETAILED DESCRIPTION

A radar-based occupancy detection system in accordance with the present disclosure will now be described more fully with reference to the accompanying drawings, in which a preferred embodiment of the radar-based occupancy detection system is presented. The radar-based occupancy detection system may, however, be embodied in many different forms and should not be construed as being limited to the embodiments set forth herein. Rather, these embodiments are provided so that this disclosure will convey certain exemplary aspects of the radar-based occupancy detection system to those skilled in the art.

Figure 1:
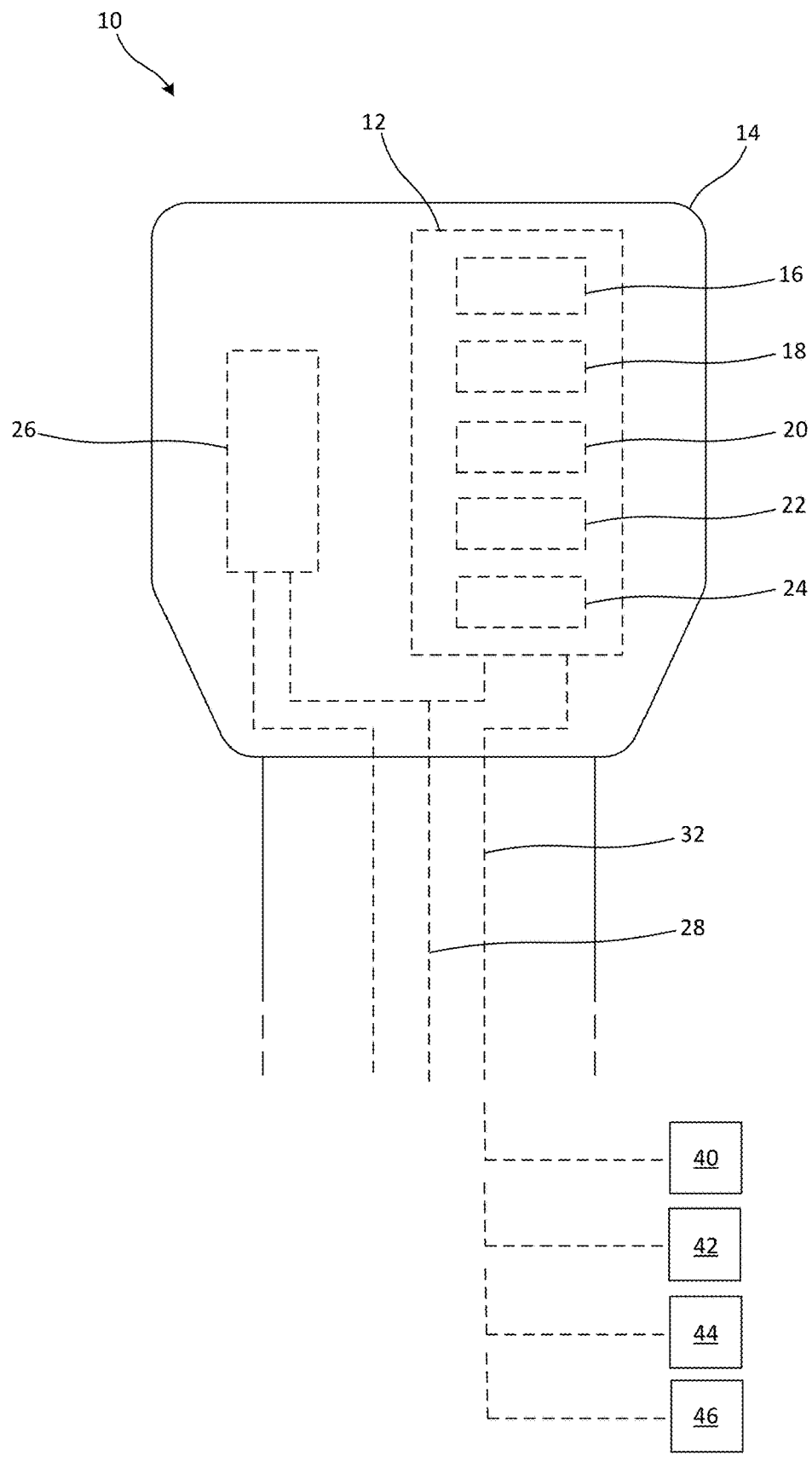
FIG. 1 is schematic diagram illustrating a radar-based occupancy detection system in accordance with an exemplary embodiment of the present disclosure.

FIG. 1 is a schematic diagram of a radar-based occupancy detection system 10 (hereinafter the "detection system 10") in accordance with an exemplary embodiment of the present disclosure. Generally, the detection system 10 may include a radar module 12 disposed within a seatbelt buckle 14 of an automobile's vehicle restraint system (e.g., seatbelt system). The seatbelt buckle 14 may be of any conventional variety familiar to those of ordinary skill in the art and may be adapted to receive and releasably retain a tongue of a seatbelt, for example. In various embodiments, the seatbelt buckle 14 may be used to a secure one or more of a shoulder belt, a lap belt, a 5-point harness, or other type of safety belt in various types of vehicles (e.g., automotive, marine, aircraft, etc.).

The radar module 12 may include an antenna 16, a radio frequency (RF) transmitter 18, a RF receiver 20, a duplexer 22, and a processor 24. The RF transmitter 18 may be configured to produce a radio frequency (RF) signal (e.g., pulsed wave or continuous wave RF signal) that may be broadcasted by the antenna 16. In some embodiments, the RF transmitter 18 may produce RF signals in the millimeter wave frequency spectrum. The present disclose is not limited in this regard. The RF receiver 20 may amplify and demodulate RF signals that are received by the antenna 16 and may output the amplified and demodulated signals to the processor 24. The duplexer 22 may alternately switch the antenna 16 between the RF transmitter 18 and the RF receiver 20. Alternatively, it is contemplated that the radar module 12 may include separate transmitter and receiver antennas. The operation of the radar module 12 will be described in greater detail below.

While the above-described components of the radar module 12 are shown in FIG. 1 as being integral with (e.g., housed within) the seatbelt buckle 14, it is contemplated that one or more of the RF transmitter 18, RF receiver 20, duplexer 22, and processor 24 (i.e., components of the radar module 12 other than the antenna 16) can alternatively be located outside of the seatbelt buckle 14, elsewhere within a vehicle. For example, one or more of the RF transmitter 18, RF receiver 20, duplexer 22, and processor 24 may be located within a dashboard or floor of a vehicle and/or may be collocated or integral with a vehicle's electronic control unit (ECU). The present disclosure is not limited in this regard.

In addition to housing the radar module12, the seatbelt buckle 14 may house other electronic components that are conventional in modern automobiles. For example, as shown in FIG. 1, the seatbelt buckle 14 may include a buckle sensor 26 that is configured to determine whether a tongue of a seatbelt is fastened within the seatbelt buckle 14. The buckle sensor 26 may receive electrical power via a power line 28 that extends into the seatbelt buckle 14. Advantageously, the radar module 12 may also be connected to power line 28 and may receive electrical power therefrom. The radar module 12 may therefore be implemented in a conventional seatbelt buckle without requiring the addition of a new, dedicated power line for the radar module 12. In various embodiments, the radar module 12 and the buckle sensor 26 may be implemented on a common circuit board and/or may share various circuit components.

Figure 2:
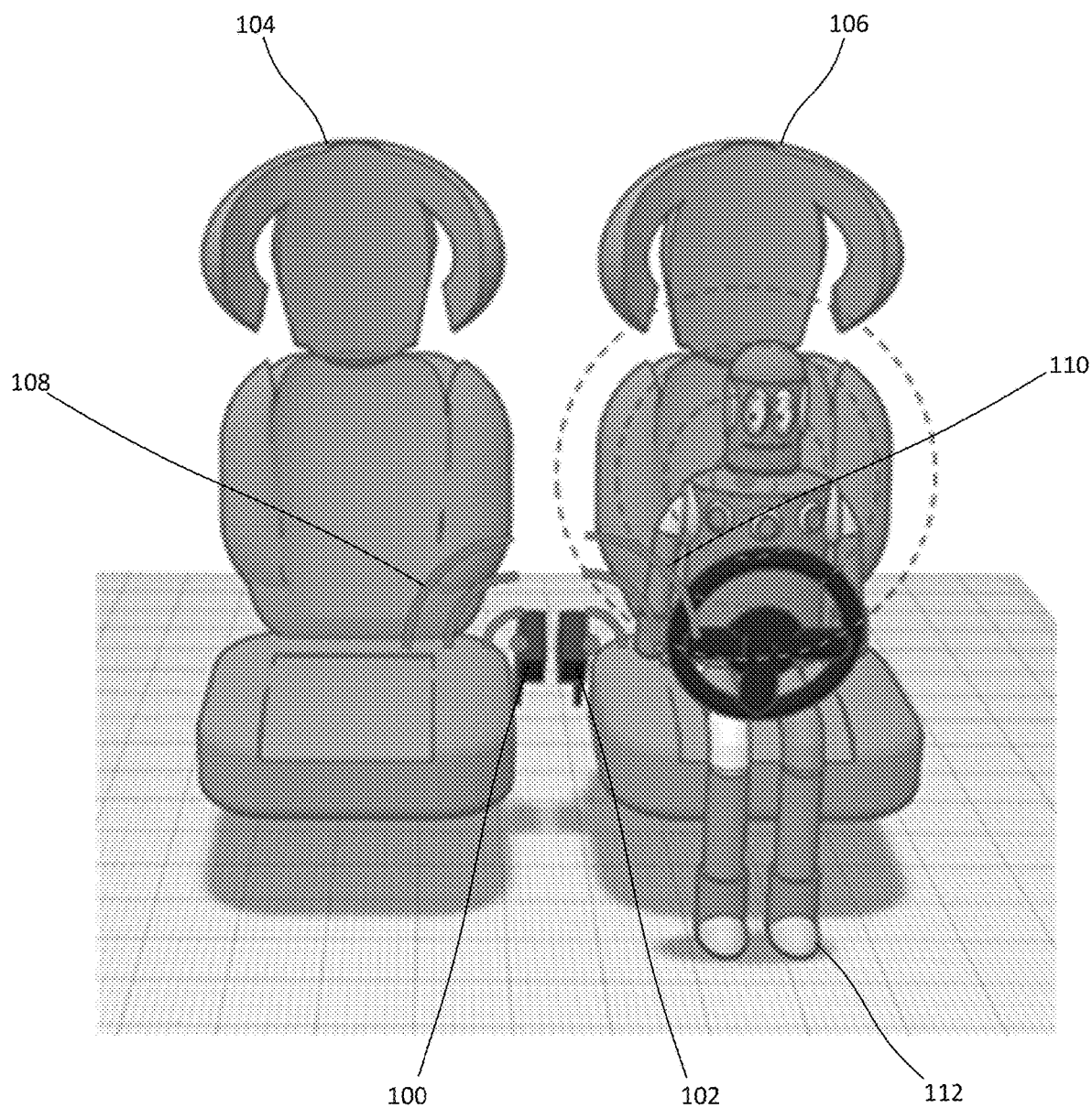
FIG. 2 is a schematic illustration of an exemplary implementation of the radar-based occupancy detection system shown in FIG. 1 within a vehicle.

Referring now to FIG. 2, an exemplary implementation of the detection system 10 of the present disclosure is illustrated, wherein seatbelt buckles 100, 102 associated with a vehicle's passenger seat 104 and driver seat 106, respectively, may each include an integrated radar module that is substantially similar to the radar module 12 described above and shown in FIG. 1. That is, each of the seatbelt buckles 100, 102 may be substantially similar to the seatbelt buckle 14 shown in FIG. 1. During operation of the detection system 10, the antennas 16 of the radar modules 12 in the seatbelt buckles 100, 102 may broadcast pulsed wave or continuous wave RF signals 108, 110 that are generated by the RF transmitters 18 of the radar modules 12. Alternatively, the radar modules 12 in the seatbelt buckles 100, 102 may share a single RF transmitter 18.

The antennas 16 of the radar modules 12 in the seatbelt buckles 100, 102 may be configured such that the RF signals 108, 110 are directed to spaces that would be occupied by persons or objects situated in the passenger seat 104 and the driver seat 106, respectively. Portions of the RF signals 108, 110 that are reflected off of the passenger seat 104 and the driver seat 106, and/or off of persons or objects in the passenger seat 104 and driver seat 106, may be received by the antennas 16. The signals may be delivered to the RF receivers 20, where the signals may be demodulated, amplified, and communicated to the processors 24 of the radar modules 12. Based on information derived from the signals, including, but not limited to, time of flight, frequency change, amplitude ratio, etc., the processors 24 may determine whether a person or object is present in the passenger seat 104 and/or in the driver seat 106 and may further characterize the person or object (e.g., as an adult, a child, a bag, a child seat, etc.).

The determinations made by the processors 24 of the radar modules 12 in the seatbelt buckles 100, 102 may be communicated to various systems within the vehicle via output lines 32 (see FIG. 1) of the radar modules 12 to facilitate or enhance the operation of such systems. For example, the processor 24 of the radar module 12 in the seatbelt buckle 102 may output a signal to a seatbelt buckle system 40 of the vehicle indicting that the driver seat 106 of the automobile contains an occupant 112. The seatbelt belt buckle system 40 may in-turn activate notification indicia (e.g., a "seatbelt unbuckled" status light and/or a chime) if a seatbelt associated with the driver seat 106 is unbuckled. In another example, the processor 24 may output a signal to a safety retention system 42 of the vehicle and the deployment of airbags associated with the passenger seat 104 and driver seat 106 may be dictated according to whether human occupants are detected within the seats 104, 106, and the force and/or size of airbag deployment may be varied according to the type of occupants (e.g., child or adult) that are detected in the seats. In another example, the processor 24 may output a signal to a climate control system 44 of the vehicle to direct cooled or heated air to particular spaces or zones associated with the passenger seat 104 and driver seat 106 depending on whether or not occupants are detected in the seats. In another example, the processors 24 may communicate occupant information to the vehicle's ECU 46 to improve engine performance.

While the exemplary implementation shown in FIG. 2 includes two seatbelt buckles 100, 102, it will be appreciated that the detection system 10 of the present disclosure may be implemented in as few as one or in as many as all of the seatbelt buckles in a particular vehicle. The present disclosure is not limited in this regard.

It will be appreciated by those of ordinary skill in the art that detection system 10 of the present disclosure can be implemented at a reduced cost and with less complexity relative to conventional pressure sensor-based occupancy detection systems, thereby increasing the feasibility of implementing occupancy detection in all seats of a vehicle (i.e., instead of only in a driver seat and a front passenger seat, for example). Additionally, the detection system 10 of the present disclosure provides an advantage over conventional pressure sensor-based occupancy detection systems in that it facilitates more detailed characterization of objects and occupants in the seats of a vehicle.

As used herein, an element or step recited in the singular and proceeded with the word "a" or "an" will be understood as not excluding plural elements or steps, unless such exclusion is explicitly recited. Furthermore, references to "one embodiment" of the present disclosure are not intended to be interpreted as excluding the existence of additional embodiments incorporating the recited features.

The present disclosure is, not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, while the present disclosure has been described herein in the context of a particular implementation in a particular environment for a particular purpose, those of ordinary skill in the art will recognize its usefulness is not limited thereto. Embodiments of the present disclosure may be beneficially implemented in any number of environments for any number of purposes. Accordingly, the claims set forth below shall be construed in view of the full breadth and spirit of the present disclosure as described herein.

The invention claimed is:

1. A radar-based occupancy detection system comprising:
a seatbelt buckle disposed adjacent a seat of a vehicle; and
a radar module disposed within the seatbelt buckle, the radar module including an antenna configured to broadcast a radio frequency (RF) signal toward the seat;
wherein the seatbelt buckle includes a buckle sensor that receives electrical power via a power line that extends into the seatbelt buckle, and wherein the radar module also receives electrical power via the power line.

2. The radar-based occupancy detection system of claim 1, wherein the radar module further includes a RF transmitter and a RF receiver coupled to the antenna.

3. The radar-based occupancy detection system of claim 2, wherein the radar module further includes a processor that is coupled to the receiver, wherein the processor is configured to derive signal information from output received from the receiver, the signal information including at least one of time of flight, frequency change, and amplitude ratio.

4. The radar-based occupancy detection system of claim 3, wherein the processor is configured to characterize occupancy of the seat based on the signal information.

5. The radar-based occupancy detection system of claim 4, wherein the processor is configured to communicate information relating to occupancy of the seat to at least one of a seatbelt buckle system, a safety retention system, a climate control system, and an electronic control unit of the vehicle.

6. The radar-based occupancy detection system of claim 2, wherein the transmitter is configured to produce a pulsed wave RF signal.

7. The radar-based occupancy detection system of claim 2, wherein the transmitter is configured to produce a continuous wave RF signal.

8. The radar-based occupancy detection system of claim 2, wherein the transmitter is configured to produce RF signals in the millimeter wave frequency spectrum.

9. A radar-based occupancy detection system comprising:
a seatbelt buckle disposed adjacent a seat of a vehicle; and
a radar module disposed within the seatbelt buckle, the radar module comprising: an antenna configured to broadcast a radio frequency (RF) signal toward the seat;
a RF transmitter and a RF receiver coupled to the antenna; and
a processor coupled to the receiver, wherein the processor is configured to derive signal information from output received from the receiver, the signal information including at least one of time of flight, frequency change, and amplitude ratio;
wherein the processor is configured to characterize occupancy of the seat based on the signal information; and
wherein the processor is configured to communicate information relating to occupancy of the seat to a system in the vehicle to influence operation of such system;
wherein the seatbelt buckle includes a buckle sensor that receives electrical power via a power line that extends into the seatbelt buckle, and wherein the radar module also receives electrical power via the power line.

10. The radar-based occupancy detection system of claim 9, wherein an output of the processor is operatively connected to a seatbelt buckle system of the vehicle.

11. The radar-based occupancy detection system of claim 9, wherein an output of the processor is operatively connected to a safety retention system of the vehicle.

12. The radar-based occupancy detection system of claim 9, wherein an output of the processor is operatively connected to a climate control system of the vehicle.

13. The radar-based occupancy detection system of claim 9, wherein an output of the processor is operatively connected to an electronic control unit of the vehicle.

14. The radar-based occupancy detection system of claim 9, wherein the transmitter is configured to produce a pulsed wave RF signal.

15. The radar-based occupancy detection system of claim 9, wherein the transmitter is configured to produce a continuous wave RF signal.

16. The radar-based occupancy detection system of claim 9, wherein the transmitter is configured to produce RF signals in the millimeter wave frequency spectrum.

* * * * *